United States Patent
Al-Yateem

(10) Patent No.: US 8,545,777 B2
(45) Date of Patent: Oct. 1, 2013

(54) METHOD OF MAKING AN ACID-ABSORBING BIOSOLID COMPOSITION

(76) Inventor: Abdullah A. Al-Yateem, Heteen (KW)

( * ) Notice: Subject to any disclaimer, the term of this patent is extended or adjusted under 35 U.S.C. 154(b) by 0 days.

(21) Appl. No.: 13/584,344

(22) Filed: Aug. 13, 2012

(65) Prior Publication Data

US 2013/0091914 A1    Apr. 18, 2013

Related U.S. Application Data

(63) Continuation of application No. 13/275,153, filed on Oct. 17, 2011, now abandoned.

(51) Int. Cl.
| | | |
|---|---|---|
| *C05F 7/00* | (2006.01) | |
| *B01J 20/22* | (2006.01) | |
| *B01D 53/50* | (2006.01) | |
| *B01D 53/52* | (2006.01) | |
| *B01D 53/46* | (2006.01) | |
| *B01D 53/38* | (2006.01) | |

(52) U.S. Cl.
USPC .......... 423/210; 71/12; 423/230; 423/244.01; 502/400

(58) Field of Classification Search
USPC .............. 71/11–26; 423/210–248, 244.01; 502/400
See application file for complete search history.

(56) References Cited

U.S. PATENT DOCUMENTS

| 7,947,104 | B2 * | 5/2011 | Burnham et al. | 71/11 |
|---|---|---|---|---|
| 2005/0039508 | A1 * | 2/2005 | Burnham et al. | 71/11 |
| 2006/0243009 | A1 * | 11/2006 | Burnham | 71/11 |
| 2008/0003156 | A1 * | 1/2008 | Prim et al. | 423/220 |
| 2008/0047313 | A1 * | 2/2008 | Johnson et al. | 71/31 |
| 2010/0139346 | A1 * | 6/2010 | Burnham | 71/12 |

OTHER PUBLICATIONS

Prior art cited in parent U.S. Appl. No.13/275,153, filed Oct. 17, 2011, the priority of which is claimed herein.

* cited by examiner

*Primary Examiner* — Wayne Langel
(74) *Attorney, Agent, or Firm* — Richard C. Litman

(57) ABSTRACT

The method of making an acid-absorbing biosolid composition provides a method for the use of recycled materials to produce an acid-absorbing composition that may then be recycled as a fertilizer after absorbing the acid. The method includes the steps of: collecting sewage sludge; drying the sewage sludge to remove water therefrom to form dried sludge; adding hydrochloric acid to the dried sludge to form a liquid intermediary product; heating the liquid intermediary product to produce a dried porous biomass; and mixing inorganic waste material with the dried porous biomass to produce the acid-absorbing biosolid composition. Thereafter, the acid-absorbing biosolid composition may be placed in a gas flow to absorb an acidic component therefrom; and then recycled for use as fertilizer following absorption of the acidic component from the gas flow.

9 Claims, No Drawings

METHOD OF MAKING AN ACID-ABSORBING BIOSOLID COMPOSITION

CROSS-REFERENCE TO RELATED APPLICATIONS

This is a continuation of my prior application Ser. No. 13/275,153, filed Oct. 17, 2011 now pending.

BACKGROUND OF THE INVENTION

1. Field of the Invention

The present invention relates to recycled biosolids, biomasses and the like, and particularly to a method of making an acid-absorbing biosolid composition for removing acidic gasses from gas streams produced by the chemical treatment of sewage sludge.

2. Description of the Related Art

The production of useful biosolids and biomasses from sewage sludge is known. In one such prior method, dewatered sewage sludge is dried to form a granulated organic fertilizer, which is then pyrolized to form a porous end product. Although this and similar fertilizers may also be used for a wide range of applications, they suffer from manufacturing methods that require them to maintain a basic pH throughout their manufacture and usage. This requires that the manufacturing method be relatively complex and inefficient in terms of both cost and manufacturing time. Given that it is desirable to recycle sewage sludge in order to decrease overall energy expenditures, and also to decrease chemical treatments of the sludge, which may have a negative environmental impact, a process that does not require such careful maintenance of a basic pH throughout would be desirable. Furthermore, it is desirable to provide a substance that removes hydrogen sulfide, sulfur dioxide, and other sulfur-containing gases from the gases produced during the chemical treatment of sewage sludge to reduce air pollution that might otherwise contribute to acid rain.

Thus, a method of making an acid-absorbing biosolid composition solving the aforementioned problems is desired.

SUMMARY OF THE INVENTION

The method of making an acid-absorbing biosolid composition provides a method for the use of recycled materials to produce an acid-absorbing composition that may subsequently be recycled for use as a fertilizer after absorbing the acidic gas. The method includes the steps of: collecting a sewage sludge; drying the sewage sludge to remove water therefrom to form dried sludge; adding hydrochloric acid to the dried sludge to form a liquid intermediary product; heating the liquid intermediary product to produce a dried porous biomass; and mixing inorganic waste material with the dried porous biomass to produce an acid-absorbing biosolid composition. Thereafter, the acid-absorbing biosolid composition may be placed in a gas flow to absorb an acidic component therefrom; and then used as fertilizer following absorption of the acidic component from the gas flow.

These and other features of the present invention will become readily apparent upon further review of the following specification.

DETAILED DESCRIPTION OF THE PREFERRED EMBODIMENTS

The method of making an acid-absorbing biosolid composition provides a method for the use of recycled materials to produce an acid-absorbing composition that may subsequently be recycled for use as a fertilizer after absorbing the acidic gas. Initially, sewage sludge is collected. The sewage sludge firms the primary component of the recycled acid-absorbing biosolid composition. Preferably the sewage sludge should have a pH of about 4.0. If the collected sludge does not naturally have a pH of about 4.0, then the sewage sludge may be treated with an appropriate quantity of acid or base to bring the pH level to about 4.0.

The sewage sludge is then dried to completely remove water therefrom. This forms a dried sludge product. The drying is preferably performed through the application of heat in a temperature range of about 600° C. to about 1,000° C. Following the drying of the sewage sludge to completely remove the water therefrom, hydrochloric acid is added to the dried sludge to form a liquid intermediary product. The treatment with the hydrochloric acid, or any other suitable type of acid, may include stirring or any other suitable type of agitation required to adequately mix the acid with the sludge. This mixing is preferably performed until such time as the pH of the mixture assumes a steady value of between about 1.0 and 4.0. The liquid intermediary product is then, once again, heated to produce a dried porous biomass. The hydrochloric acid is added to increase and activate pores in the dried sludge. These pores are used in the absorption of acidic pollution gases.

The dried porous biomass is mixed with an inorganic waste material to produce the acid-absorbing biosolid composition. Preferably, the inorganic waste material constitutes about 45 wt % of the acid-absorbing biosolid composition. The inorganic material may be magnesium waste, calcium waste, iron waste, iodine waste, rocks, sand, or combinations thereof. In addition to the inorganic waste material, organic waste materials, such as wood powder, may also be added. It should be understood that any suitable type of waste material may be utilized, such as recyclable wastes produced by distillation plants.

In use, the acid-absorbing biosolid composition is placed in a gas flow to absorb an acidic component therefrom. An example of such use is placing the acid-absorbing biosolid composition in a wet gas flow and extracting a sulfur-containing component from the wet gas flow, such as hydrogen sulfide or sulfur dioxide. The acid-absorbing biosolid composition oxidizes the sulfur-containing gases, forming organic and inorganic sulfates of the type used in fertilizers. Following absorption of the acidic component from the gas flow, the acid-absorbing biosolid composition may be used as a fertilizer.

It is to be understood that the present invention is not limited to the embodiments described above, but encompasses any and all embodiments within the scope of the following claims.

I claim:

1. A method of making an acid-absorbing biosolid composition, comprising the steps of:
    collecting sewage sludge;
    drying the sewage sludge to remove water therefrom to form dried sludge;
    wherein said step of drying the sewage sludge includes heating the sewage sludge to a temperature between about 600° C. and about 1,000° C.;
    adding an acid to the dried sludge to form a liquid intermediary product;
    heating the liquid intermediary product to produce a dried, porous biomass; and mixing inorganic waste material with the dried porous biomass to produce an acid-absorbing biosolid composition;

wherein the inorganic waste material includes at least one material selected from the group consisting of: magnesium waste, calcium waste, iron waste, iodine waste, rocks, and sand.

2. The method of making an acid-absorbing biosolid composition as recited in claim 1, further comprising the step of adjusting the sewage sludge to a pH of about 4.0 prior to said drying step.

3. The method of making an acid-absorbing biosolid composition as recited in claim 2, wherein said step of adding the acid to the dried sludge comprises adding hydrochloric acid to the dried sludge to form the liquid intermediary product.

4. The method of making an acid-absorbing biosolid composition as recited in claim 3, wherein the hydrochloric acid is dilute hydrochloric acid.

5. The method of making an acid-absorbing biosolid composition as recited in claim 1, wherein said step of mixing the inorganic waste material with the dried porous biomass comprises adding the inorganic waste material to the dried porous biomass so that the inorganic waste material constitutes about 45 wt % of the acid-absorbing biosolid composition.

6. The method of making an acid-absorbing biosolid composition as recited in claim 1, further comprising the step of adding organic waste material to the dried porous biomass.

7. The method of making an acid absorbing biosolid composition as recited in claim 6, wherein said step of adding the organic waste material to the dried porous biomass comprises adding wood powder to the dried porous biomass.

8. A method of using an acid-absorbing biosolid composition comprising the steps of:

collecting sewage sludge;

drying the sewage sludge to remove water therefrom to form dried sludge;

wherein said step of drying the sewage sludge includes heating the sewage sludge to a temperature between about 600° C. and about 1,000° C.;

adding an acid to the dried sludge to form a liquid intermediary product;

heating the liquid intermediary product to produce a dried, porous biomass; and mixing inorganic waste material with the dried porous biomass to produce an acid-absorbing biosolid composition;

wherein the inorganic waste material includes at least one material selected from the group consisting of: magnesium waste, calcium waste, iron waste, iodine waste, rocks, and sand; and placing the acid-absorbing biosolid composition in a gas flow to absorb an acidic component therefrom.

9. A method of recycling an acid-absorbing biosolid composition comprising the steps of:

collecting sewage sludge;

drying the sewage sludge to remove water therefrom to form dried sludge;

wherein said step of drying the sewage sludge includes heating the sewage sludge to a temperature between about 600° C. and about 1,000° C.;

adding an acid to the dried sludge to form a liquid intermediary product;

heating the liquid intermediary product to produce a dried, porous biomass biomass; and mixing inorganic waste material with the dried porous biomass to produce an acid-absorbing biosolid composition;

wherein the inorganic waste material includes at least one material selected from the group consisting essentially of: magnesium waste, calcium waste, iron waste, iodine waste, rocks, and sand; and placing the acid-absorbing biosolid composition in a gas flow to absorb an acidic component therefrom; and recycling the acid-absorbing biosolid composition as fertilizer following absorption of the acidic component from the gas flow.

* * * * *